UNITED STATES PATENT OFFICE.

BASIL WILLIAM VALENTIN, OF BIRMINGHAM, ENGLAND, ASSIGNOR, BY DIRECT AND MESNE ASSIGNMENTS, TO FREDERICK TWINCH, ALFRED E. J. TOVEY, AND FRANCIS WYATT, ALL OF NEW YORK, N. Y.

PROCESS OF BREWING MALT LIQUORS.

SPECIFICATION forming part of Letters Patent No. 449,503, dated March 31, 1891.

Application filed May 6, 1890. Serial No. 350,784. (No specimens.) Patented in England March 10, 1888, No. 3,754.

*To all whom it may concern:*

Be it known that I, BASIL WILLIAM VALENTIN, of Birmingham, England, a subject of the Queen of Great Britain, have invented a new and useful Improved Process of Brewing Malt Liquors, &c., (for which I have obtained Letters Patent in England, No. 3,754, dated March 10, 1888;) and I do hereby declare that the following is a full, clear, and exact description of the invention, which will enable others skilled in the art to which it appertains to use the same.

Heretofore when the wort was drawn off from the mash-tun it generally held in solution certain nitrogenous substances which, unless they were removed, tended to make the beer turbid and to cause a deposit in the bottles or other vessels in which the beer was stored.

My invention relates to a simple method of eliminating the most objectionable of these substances. The unhopped wort in the mash-tun is usually heated up to 140° or 150° Fahrenheit, and in this condition contains certain nitrogenous substances in a dissolved or diffused condition. According to my process the unhopped wort is drawn off from the mash-tun and heated up to a temperature of about 180° Fahrenheit, at which temperature the above-referred-to nitrogenous substances coagulate. It should be heated as quickly as it runs from the tap, which necessarily requires a steam coil or jacket of adequate power. By this means I am insured a high proportion of dextrine and effect a change in the nitrogenous matter. It is then rapidly cooled again by means of a refrigerator or other cooler to about 150° Fahrenheit or lower, being a temperature at which the above-mentioned nitrogenous matter will become insoluble and separable from the wort. The wort is then passed through a sparger and sprayed over the grains, from which the wort was made, and passed through said grains. This method is continued until the whole of the wort has been circulated. The precipitated matter (nitrogenous) will be left on the surface of the grains, which act as a filter. This process may be adapted to the whole contents of the mash-tun in bulk after separation from the grains; but it is of advantage to treat successive portions of the contents, carrying on the process in a continuous manner by circulation of the wort from the mash-tun, first, through a vessel or a coil or set of pipes, by which it is rapidly heated to about 180° Fahrenheit, a temperature which, it will be seen, is below the boiling-point of the wort, and then through a refrigerator or cooler, by which it is rapidly cooled to about 150° Fahrenheit, and finally to the sparger and filtered through the grains. This circulation may be continued until the wort is so far cleared of the nitrogenous substances that no further coagulation takes place, when it is heated and cooled, as described.

The advantages of this invention are that I insure soundness and brightness in the beer and eliminate a large amount of the cask deposits, and the fining is greatly facilitated.

Having described my invention, what I claim is—

The process herein described of treating unhopped malt liquors, &c., which consists in, first, heating the unhopped wort after it has left the mash-tun to a temperature below the boiling-point, but at which certain nitrogenous substance coagulate—namely, to a temperature about 180° Fahrenheit—and in then quickly cooling the wort to a temperature at which these nitrogenous substances become insoluble—namely, about 150° Fahrenheit—and in then spraying said wort and filtering through the grain, as specified.

BASIL WILLIAM VALENTIN.

Witnesses:
ERNEST HARKER,
    *U. S. Consulate.*
J. JARRETT,
    *U. S. Consulate.*